US008513577B2

(12) United States Patent
Chen et al.

(10) Patent No.: US 8,513,577 B2
(45) Date of Patent: Aug. 20, 2013

(54) DEVICE FOR CONTROLLING A THERMO-ELECTRIC SYSTEM

(75) Inventors: Lei Chen, South Windsor, CT (US); Xiaomei Yu, Glastonbury, CT (US)

(73) Assignee: Carrier Corporation, Farmington, CT (US)

( * ) Notice: Subject to any disclaimer, the term of this patent is extended or adjusted under 35 U.S.C. 154(b) by 1061 days.

(21) Appl. No.: 11/922,734

(22) PCT Filed: Jun. 24, 2005

(86) PCT No.: PCT/US2005/022377
§ 371 (c)(1),
(2), (4) Date: Jul. 24, 2009

(87) PCT Pub. No.: WO2007/001291
PCT Pub. Date: Jan. 4, 2007

(65) Prior Publication Data
US 2009/0293500 A1    Dec. 3, 2009

(51) Int. Cl.
*H05B 1/02* (2006.01)
(52) U.S. Cl.
USPC ............ 219/505; 219/494; 219/497; 165/253
(58) Field of Classification Search
CPC ....................................................... H05B 1/02
USPC ................ 219/490, 494, 497, 499, 501, 505; 165/201, 246, 253
See application file for complete search history.

(56) References Cited

U.S. PATENT DOCUMENTS

| 4,066,365 | A  |   | 1/1978  | Staunton .................. 356/244 |
| 4,310,047 | A  | * | 1/1982  | Branson ..................... 165/64 |
| 4,548,259 | A  |   | 10/1985 | Tezuka et al. .............. 165/14 |
| 5,097,829 | A  | * | 3/1992  | Quisenberry ............. 607/105 |
| 5,213,152 | A  | * | 5/1993  | Cox ............................ 165/5 |
| 5,349,821 | A  |   | 9/1994  | Schrage ..................... 62/3.7 |
| 5,566,062 | A  | * | 10/1996 | Quisenberry et al. ...... 363/89 |
| 5,920,583 | A  | * | 7/1999  | Chen et al. ................ 372/34 |
| 6,679,065 | B1 |   | 1/2004  | Bessler |
| 7,954,332 | B2 | * | 6/2011  | Orlowski ................... 62/3.7 |
| 8,100,956 | B2 | * | 1/2012  | Quisenberry et al. ..... 607/104 |
| 2003/0063886 | A1 |   | 4/2003  | Seal et al. ................ 385/134 |

FOREIGN PATENT DOCUMENTS

JP    7234034 A    9/1995
JP    2000353830 A   12/2000

OTHER PUBLICATIONS

European Search Report for International application No. PCT/US2005022377, Dec. 7, 2010, 3 pages.
International Search Report issued Mar. 27, 2007 by the ISA/US for the corresponding PCT application PCT/US2005/022377.

* cited by examiner

*Primary Examiner* — Mark Paschall
(74) *Attorney, Agent, or Firm* — Cantor Colburn LLP

(57) ABSTRACT

A control device for a thermo-electric device having a heat source side and a heat sink side. The control device has a detector for detecting a temperature difference between the heat source side and the heat sink side. The detector modulates a current for providing an optimal current to the thermo-electric device.

5 Claims, 6 Drawing Sheets

DEVICE FOR CONTROLLING A THERMO-ELECTRIC SYSTEM

BACKGROUND OF THE INVENTION

1. Field of the Invention

The present invention relates to a device for sensing a temperature differential between a heat source side and a heat sink side of a thermo-electric device and for regulating a current in response to the temperature differential. The present invention also more particularly relates to a device for providing an optimal current to the thermo-electric device and for a more productive operation of the thermo-electric device.

2. Description of the Related Art

Thermo-electric cooling and heating devices are well known in the art and are based on the Peltier effect. The device moves heat from one location to another when current flows through a predetermined semiconductor material having a p and n type semiconductor material or pellets. Historically, thermo-electric devices are used for spot cooling. This is because the material properties and the device operation limit the device's efficiency.

Thermo-electric refrigeration devices are typically made as a module. The module then can be assembled to a larger system using an amount of appropriate heat exchangers. The heat exchangers are incorporated to enhance heat transfer and to minimize losses. Thermo-electric modules are operated under direct current. The direct current should preferably be optimized to gain a best coefficient of performance (COP). The optimal current is related to one or more material properties of the semi-conductor based materials and a temperature differential between a hot and a cold side of the module. The optimal current is expressed as follows.

$$I_\phi = \frac{(\alpha_p - \alpha_n)(T_h - T_c)}{R[(1 + ZT_M)^{1/2} - 1]} \qquad \text{Equation Number 1}$$

where $\alpha_p$ and $\alpha_n$ are the Seebeck coefficients of the p and n materials respectively, $T_c$ and $T_h$ are the temperatures of the heat source (cold side) and the heat sink (hot side) respectively, and R is the total electrical resistance of the p and n semiconductor material or pellets.

Normally, one thermo-electric module is operated at one current. The current flowing through all of the pellets is thus the same. It has been observed that when the individual modules are large (for example, to deliver large amount of cooling for commercial refrigeration purposes as an example only), significant temperature differential variations are expected on each thermoelectric module. The inventors have observed that the variation of temperature differentials from one pellet to another implies that the entire module cannot be maintained at its most efficient condition. It has been observed that this known problem in the art is aggravated for large size thermo-electric cooling systems where many thermo-electric modules for a large area are used.

It has also been observed that attempts have been made to manipulate a flow pattern and thermally isolate the thermo-electric pellets. This isolation results in a uniform temperature differential ($T_h - T_c$) being maintained for a thermo-electric module. However, the actual temperature differential may not be uniform as expected. A major heat conduction occurs along the thermally conducting but electrically insulating material that is used to prevent the working fluid or an exposed surface from contacting the thermo-electric materials. This conduction results from an electrical insulator with high thermal conductivity (ceramics) that is sandwiched between the thermo-electric pellets and the heat exchangers. This material has a high heat transfer coefficient. This is a known problem and further imposes a difficulty in maintaining the temperature differential along the flow direction.

Accordingly, there is a need for regulation of the power supplied to individual modules that show reasonable temperature uniformity along the fluid flow direction.

Accordingly, there is a need for a modular system for thermo-electric cooling products.

SUMMARY OF THE INVENTION

It is an object of the present invention to provide a control for a thermo-electric module to achieve an optimal coefficient of performance.

It is an object of the present invention to provide a control for a thermo-electric module with the control modulating the module so the module is driven by an optimal current for an optimal coefficient of performance.

It is another object of the present invention to provide a control system for a thermo-electric device with the system achieving a real-time optimal efficiency for individual thermoelectric modules by regulating power supplied thereto.

It is yet another object of the present invention to provide a system having a control that detects a temperature differential sensed by thermally sensitive resistors and the temperature differential sensing made by a stand-alone resistor or a functional graded thermo-electric material.

It is yet another object of the present invention to provide a system having a thermally sensitive composition at an end of a thermo-electric pellet.

It is an object of the present invention to provide a system for optimizing an operation of a thermo-electric module with a thermally sensitive resistor to sense a temperature differential or a number of temperature differentials per unit time.

It is an object of the present invention to provide a system for optimizing an operation of a thermo-electric module with thermistors with a negative temperature coefficient or a positive temperature coefficient or the combination of both to detect the temperature differential between a hot and a cold plate.

It is an object of the present invention to provide a system for optimizing an operation of a thermo-electric module with circuitry to adjust a voltage or a current supplied to the thermo-electric module to operate the module at an optimal current to achieve an optimal coefficient of performance (COP).

It is an object of the present invention to provide a system for optimizing an operation of a thermo-electric module with a functional graded thermoelectric material that incorporates a tailored composition at two ends of thermo-electric pellets with a resistance sensitive to a temperature change.

It is an object of the present invention to provide a system for optimizing an operation of a thermo-electric module with a thermally sensitive material at a portion connected to a hot side with a positive temperature coefficient and adjacent to a cold side with a negative temperature coefficient.

It is still another object of the present invention to provide a system for optimizing an operation of a thermo-electric module with pellets made by such graded materials would react to the change in temperature differentials by altering a resistance automatically.

It is an object of the present invention to provide a system for optimizing an operation of a thermo-electric module with a pellet to be operated at an optimal condition without externally altering the current flowing through an entire thermo-electric module of the system.

These and other objects of the present invention are accomplished by a control device or a thermo-electric material of the present invention. The control device is for a thermo-electric device with a heat source side and a heat sink side. The control device has a detector for detecting a temperature difference between the heat source side and the heat sink side. The apparatus associated with the detector modulates a current for providing an optimal current to the thermo-electric device.

DETAILED DESCRIPTION OF THE INVENTION

Figure 1:
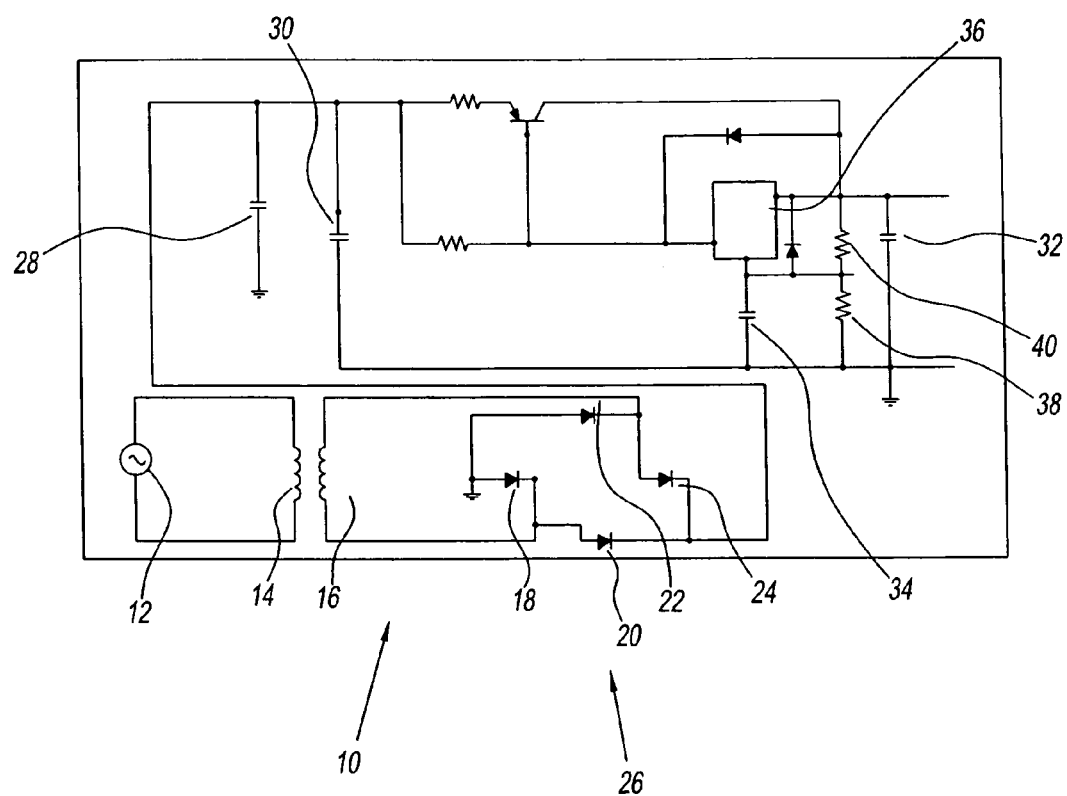
FIG. 1 is a circuit diagram of an adjusting direct current power regulator of the prior art.

Referring to the figures and in particular FIG. 1, there is shown a prior art system 10 of an existing power regulating device. The system 10 has a power source preferably an alternating power source 12 connected to a first coil 14 that is spaced from a second coil 16. The first coil 14 and the second coil 16 preferably are a pair of inductive coils to reduce the voltage from the alternating power source 12 to the remainder of the circuit of the system 10. The second coil 16 is preferably connected to the diodes 18, 20, 22, 24 that form a full-wave rectifier generally represented by reference numeral 26 that converts the alternating power to a direct current. The second coil 16 is preferably center tapped and various designs for this transformer are well known in the art and are employed in practice.

The system 10 further has an input filter capacitor 28 connected to a filter capacitor 30 for a ripple rejection and to improve a power quality of the system 10. The prior art system 10 also has an output filter capacitor 32 and a bypass capacitor 34 for protection of the system. The system 10 also has a three-terminal voltage regulator 36. The three terminal voltage regulator 36 is connected to a first variable resistor 38. The first variable resistor 38 is preferably manually actuated for controlling a current directed to a thermo-electric device (not shown) and is known in the art. This system 10 arrangement is not favored as it does not lead to an automatic adjusted operation of the thermo-electric device at the optimal coefficient of performance. In this embodiment, the output voltage is related indirectly to the input voltage, which comes out from the full-wave rectifier 26 by the following equation:

$$V_{out}=V_{ref}(1+R_1/R_4)$$  Equation Number 2

Figure 2:
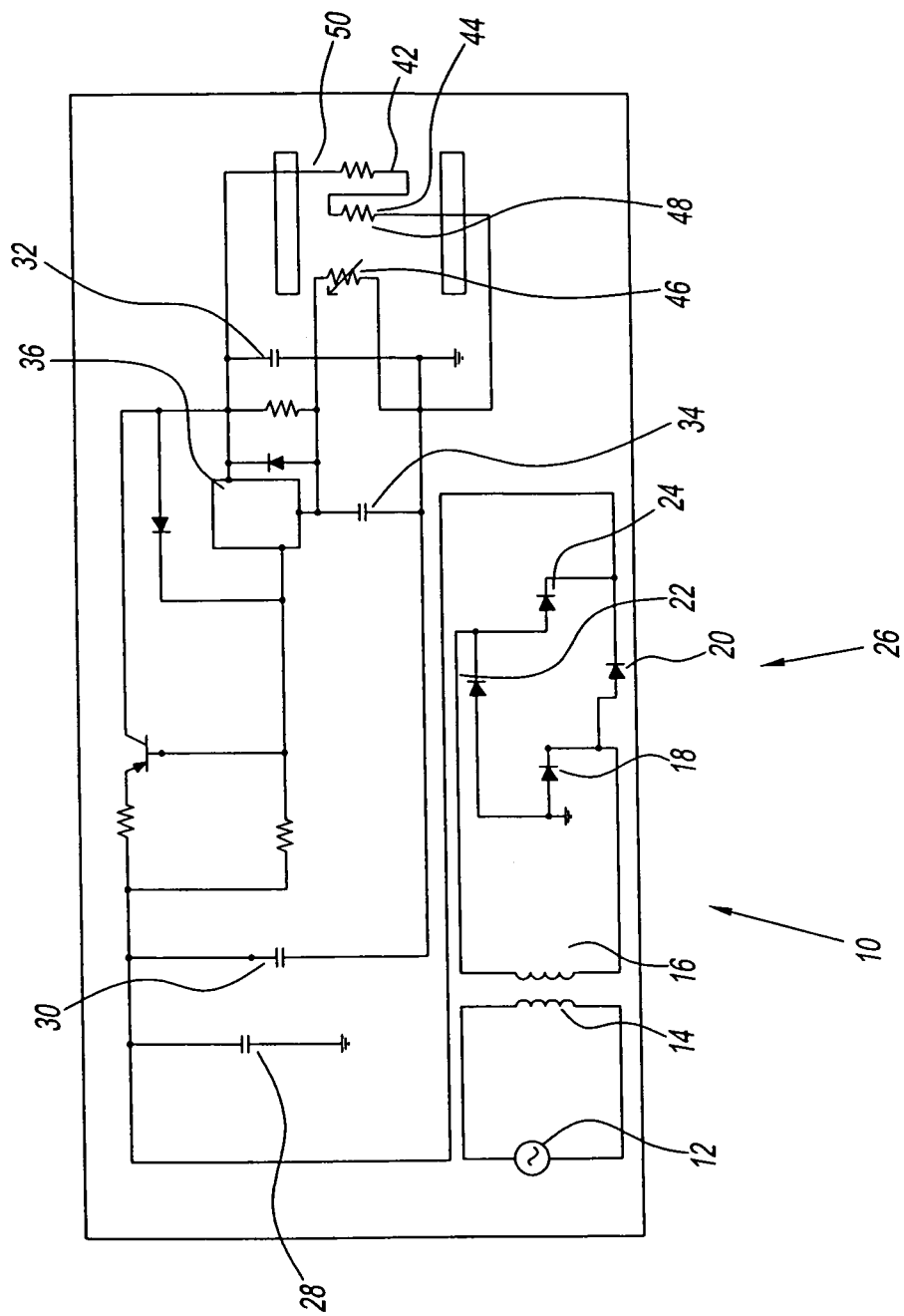
FIG. 2 is a circuit diagram of a device for regulating a power supply of a thermo-electric device of the present invention based on a temperature of a first side of the thermo-electric device or a second side of the device.

$V_{ref}$ is the reference voltage across resistor $R_4$ generally represented by reference numeral 40. The variable resistor $R_1$ 38 has a variable resistance that contributes to regulating the output voltage and usually is manually actuated as is known in the art. Referring now to FIG. 2, there is shown a circuit 10 of the present invention. In this embodiment, the circuit 10 shows a first thermo-electric element or pellet 42 connected in series to a second thermo-electric element or pellet 44, and the pattern is repeated to form a thermo-electric device or module. The circuit 10 further has a thermally sensitive sensor such as a thermistor 46. The thermistor 46 has preferably a negative temperature coefficient thermal resistor if it is thermally connected to a cold side or heat source 48 or preferably has a positive temperature coefficient it is connected to a hot side or heat sink 50. In this manner, the current is regulated to the entire module of repeated thermo-electric pellets 44, and 42 by a change in the resistance from the thermistor 46. In another embodiment, a control signal for regulating power may be derived from the direct resistance measurement. In other embodiments, the resistance change information may be converted (amplified, filtered, and processed) for regulating the output voltage or current for driving the thermoelectric devices having pellets 42, 44, and the like.

Preferably and alternatively one or more thermally sensitive resistors or sensors may be connected to the heat exchange surfaces of the heat source side 48 and heat sink side 50. Alternatively, the one or more thermally sensitive resistors, or sensors may be embedded in working fluids (not shown) of the system 10. In this manner, the one or more thermally sensitive resistors 46 adjust the power supplied to the thermoelectric devices having the pellets 42, 44 to achieve optimal efficiency. One skilled in the art will recognize that any resistor that is sensitive to temperature may be used and is within the scope of the present invention.

FIG. 2 shows an embodiment preferably most useful when either the heat sink side 50 or the heat source side 48 holds almost a constant temperature. The system 10 of the present disclosure preferably detects a temperature difference at one or more points of the temperature control device then modulates current. When the heat source side 48 is to be held at a constant temperature, the system 10 has preferably a thermal resistor with a positive temperature coefficient resistor connected to the heat sink exchanger surface, or has the positive temperature coefficient thermal resistor in the working fluid associated with the heat sink side 50.

Along with other operating parameters such as a working fluid flow rate, cascading cooling stages, and an input voltage the thermal sensitive resistors and/or the reference resistor 40 can be adjusted to set the operating point of the cooling or heating system. In another embodiment, the system 10 may have a number of thermal resistors with different nominal temperatures associated with certain resistance. Preferably, the adaptive power regulating mechanism enables a self and a continuous control of the cooling or heating device to optimal parameters. One skilled in the art will appreciate that a temperature runaway of the devices needs to be avoided in these cases and this can be avoided by the adjustable voltage regulator 36 or by modifying the system 10 to set up a cut-off voltage as is well known in the art. The cut-off voltage shuts down the cooling or heating device 42, 44 and the system 10 can be designed to reach the desired cooling capacity before the temperature runaway occurs.

Figure 3:
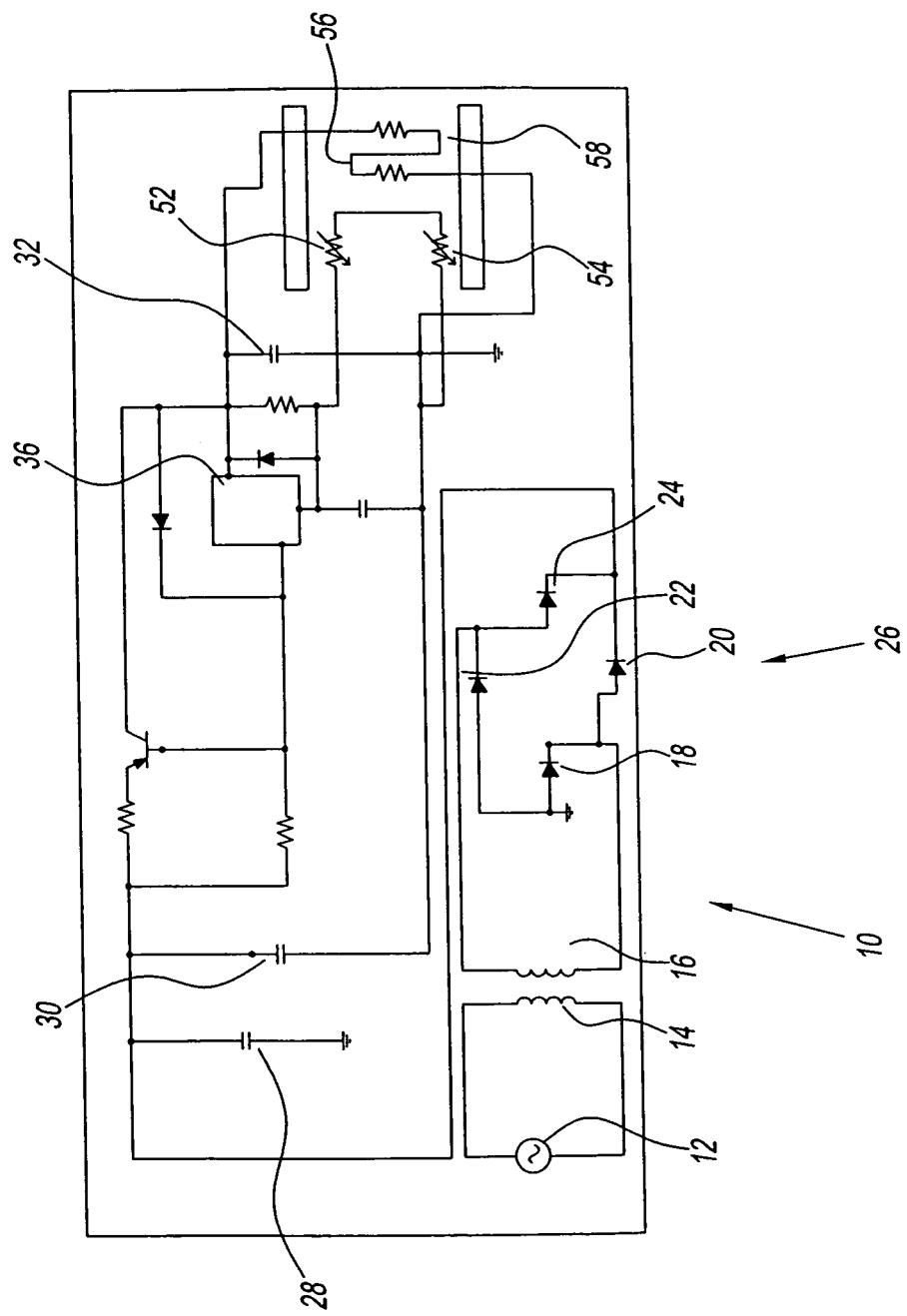
FIG. 3 is another embodiment of a circuit diagram for regulating a power supply of a thermo-electric device based on a temperature difference between a first side of the thermo-electric device and a second side of the thermo-electric device.

Referring now to FIG. 3, there is shown another circuit diagram of the system 10 of the present invention. In this embodiment, the system 10 has the first thermistor 52 and a second thermistor 54. The first thermistor 52 is connected to the heat source side 48 of a thermo-electric device and the second thermistor 54 is thermally connected to a heat sink side of the same thermo-electric device. The first thermistor 52 is preferably a negative temperature coefficient resistor that has a resistance that decreases as a temperature of the heat source side 48 increases, and vice versa. The second thermistor 54 is preferably a positive temperature coefficient resistor that is thermally connected to the heat sink side. This change in the resistance of the first thermistor 52 and a change in the resistance of the second thermistor 54 represent a change in temperature differential between the heat source side and the heat sink side. In this manner, the current is regulated to the thermo-electric device by a change in the resistance from the thermistor 54 and thermistor 52.

In this embodiment, the voltage (current) is increased by having the positive temperature coefficient resistor 54 in contact with the heat sink and the negative temperature coefficient resistor 52 in contact with the heat source side. The positive temperature coefficient resistor 54 and the negative coefficient resistor 52 are preferably connected as shown in FIG. 3. The change in a total resistance accurately reflects a temperature differential between the heat sink side and heat source side of a thermo-electric module, and thus the cooling or heating device may be operated more efficiently by a change in current supplied thereto.

Figure 4:
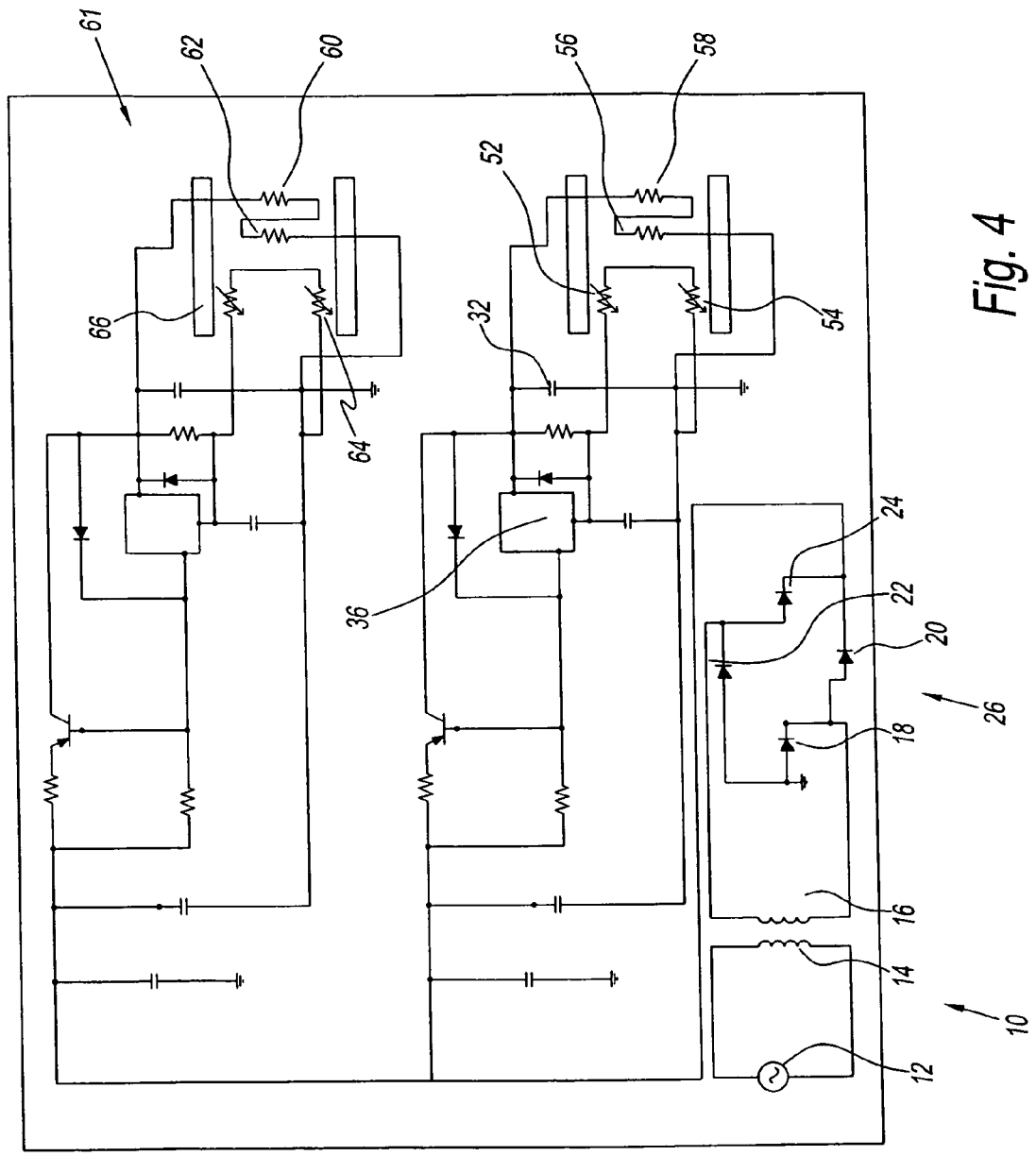
FIG. 4 is another embodiment of a circuit diagram for regulating a power supply of a number of multiple thermo-electric modules.

Referring to FIG. 4, to generate meaningful cooling or heating, it is likely multiple thermoelectric modules need to be arranged to provide desired capacity with useful cold or warm temperature. For cascading thermoelectric system the modulated power supply would show even greater benefit because each module is controlled with individual level of power. As shown in FIG. 4, an additional thermo-electric module 61 would have an additional third thermistor 64 and a fourth thermistor 66 to regulate the current supplied to a second thermo-electric module with thermo-electric pellets 60, 62, and the repeated units alike. The fourth thermistor 66 is preferably a negative temperature coefficient resistor that is thermally connected to the heat source side. The third thermistor 64 preferably is connected to a heat sink side. The arrangement of the additional modules, in one embodiment, would be similar to the embodiment shown in FIG. 2, or another arrangement that is within the scope of the present disclosure for heating and cooling. The change in the resistance represents a change in a temperature differential between the heat source side and the heat sink side for a more optimal current to be applied to the system 10.

Figure 5:
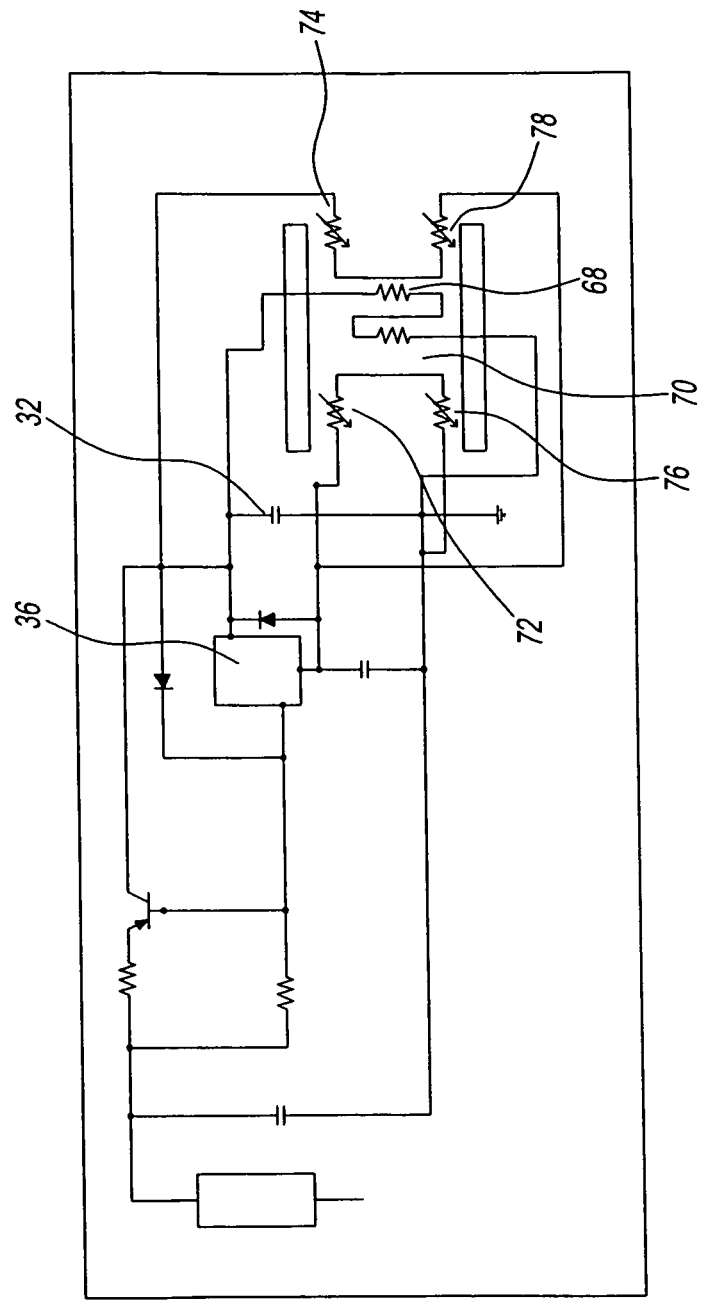
FIG. 5 is still yet another embodiment of a circuit diagram for regulating a power supply of a thermo-electric device, which has a reference and a variable resistor that can be temperature sensitive resistors for increasing an operating efficiency of the device.

FIG. 5 shows a system for operation in a larger temperature range, or with short response time requirement. FIG. 5 shows the system 10 having a first thermal resistor 72 and a second thermal resistor 78. Both the first thermal resistor 72 and the second thermal resistor 78 are each negative temperature coefficient resistors and are thermally connected to a heat source side and a heat sink side respectively of a thermo-electric device. The third thermal resistor 76 and the fourth thermal resistor 74 are each preferably positive temperature coefficient resistors and are connected to the heat sink side and the heat source side respectively of the same thermo-electric module. The change in resistance of the thermal resistors 72, 74, 76, 78 represents a change in a temperature differential between the heat source side and the heat sink side. This system 10 preferably renders an even more sensitive control because the ratio of the combined resistance of the third thermal resistor 76 and the first thermal resistor 72 to that of the second thermal resistor 78 and fourth thermal resistor 74 will be greater given a certain change in a temperature differential between the heat sink side and the heat source side. In this manner, the output voltage is equal to the reference voltage multiplied by one plus the ratio, which is given as, in this one non-limiting embodiment as the combined resistance of the first thermal resistor 72 and the third thermal resistor 76 divided by the resistance of the fourth thermal resistor 74 and the second thermal resistor 78.

Figure 6:
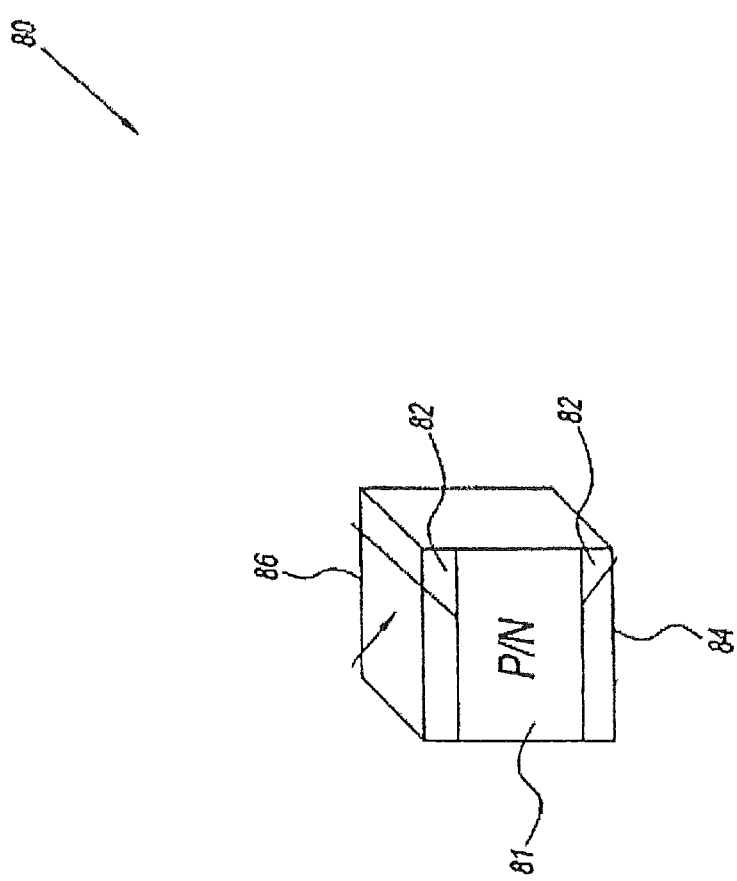
FIG. 6 is a side cross sectional view of another embodiment for regulating a power supply of a thermo-electric device with the thermo-electric device having a graded doped material in the p/n semiconductor material.

Referring now to FIG. 6, there is shown still another embodiment of the present invention. The system 10 has a thermo-electric pellet 81 (p or n type pellet) with a portion being adjacent to a heat sink doped with a graded thermally sensitive material 82 with negative temperature coefficient that enriches toward the surface of the pellet. The thermally sensitive material 82 makes the p and n type semiconductor material (or pellet) 81 to be self adaptive and has a resistance that changes in response to temperature. By the same reasoning, the thermally sensitive material 83 with positive temperature coefficient is managed to enrich towards the heat source side 84 by doping or mechanical dispersion into the pellet. Preferably, the thermo-electric pellets therein are doped with suitable thermally sensitive materials. These materials are metal oxides and a mixture and/or a derivative thereof. Some non-limiting examples are $Mn_3O4$ with various other elements such as Co, Ni, Cu, Fe, Zn, or suitable alternatives. Other examples are $Fe3O4$—$ZnCr2O4$ or a derivative, $BaTiO3$ and a derivative thereof. Preferably, the composition of the thermally sensitive material is doped with a suitable amount to obtain resistance based on temperature change. In one non-limiting embodiment, the amount can be about 0.01 to about twenty percent atomic percentage of the doped material relative to the matrix material. Preferably, the thermally sensitive materials 82, 83 in the p and n type semiconductor materials are doped by diffusion, co-precipitation, hydrothermal co-precipitation, sintering, powder metallurgical approach with a mechanical mixing and sintering and any combinations thereof.

It should be understood that the foregoing description is only illustrative of the present invention. Various alternatives and modifications can be devised by those skilled in the art without departing from the invention. Accordingly, the present invention is intended to embrace all such alternatives, modifications and variances.

What is claimed is:

1. A control device for a thermo-electric device having a heat source side and a heat sink side, the control device comprising:
   a detector for detecting a temperature difference between the heat source side and the heat sink side, said detector for modulating a current for providing current to said thermo-electric device;
   wherein said detector for detecting said temperature difference between the heat source side and the heat sink side comprises a negative temperature coefficient resistor being connected to said heat source side and a positive temperature coefficient resistor being connected to said heat sink side.

2. The control device of claim 1, wherein said negative temperature coefficient resistor includes a variable resistor and said positive temperature coefficient resistor includes a variable resistor.

3. The control device of claim 2, wherein said negative temperature coefficient resistor and said positive temperature coefficient resistor are thermally connected to said thermo-electric device.

4. A thermally sensitive control device for a plurality of thermo-electric devices, the control device for providing current to each of the thermo-electric devices, the control device comprising:
- a plurality of temperature sensitive resistors having a variable resistance being thermally connected to a first portion and a second portion of said plurality of thermo-electric devices, said variable resistance being connected to a power supply, wherein said plurality of temperature sensitive resistors detect a temperature difference between said first portion and said second portion, and wherein said variable resistance modulates said current in response to said temperature difference for providing said current to said plurality of thermo-electric devices;
- wherein said plurality of temperature sensitive resistors includes a negative temperature coefficient resistor being thermally connected to said heat source side at said first portion;
- wherein said plurality of temperature sensitive resistors includes a positive temperature coefficient resistor being thermally connected to said heat sink side at said second portion;
- wherein said plurality of temperature sensitive resistors includes a plurality of negative temperature coefficient resistors being thermally connected to said heat source side at said first portion;
- wherein said plurality of temperature sensitive resistors includes a plurality of positive temperature coefficient resistors being thermally connected to said heat sink side at said second portion.

5. The thermally sensitive control device of claim 4, wherein said current depends from a material property of at least one of said plurality of thermo-electric devices.

* * * * *